US011320644B2

(12) United States Patent
Sun et al.

(10) Patent No.: US 11,320,644 B2
(45) Date of Patent: May 3, 2022

(54) EQUATORIAL MOUNT LOCKING DEVICE

(71) Applicant: Nantong Schmidt Opto-Electrical Technology Co., Ltd., Nantong (CN)

(72) Inventors: Yufeng Sun, Nantong (CN); Wenzhong Shen, Nantong (CN); Xuefeng Zhu, Nantong (CN)

(73) Assignee: Nantong Schmidt Opto-Electrical Technology Co., Ltd., Jiangsu (CN)

( * ) Notice: Subject to any disclaimer, the term of this patent is extended or adjusted under 35 U.S.C. 154(b) by 40 days.

(21) Appl. No.: 16/779,440

(22) Filed: Jan. 31, 2020

(65) Prior Publication Data
US 2020/0218056 A1 Jul. 9, 2020

Related U.S. Application Data

(63) Continuation-in-part of application No. PCT/CN2017/110652, filed on Nov. 13, 2017.

(30) Foreign Application Priority Data

Jul. 31, 2017 (CN) .......................... 201710637241.0

(51) Int. Cl.
*G02B 23/16* (2006.01)
*F16M 11/08* (2006.01)
(Continued)

(52) U.S. Cl.
CPC ........... *G02B 23/165* (2013.01); *F16M 11/08* (2013.01); *F16M 11/18* (2013.01);
(Continued)

(58) Field of Classification Search
CPC ...... G02B 23/165; G02B 23/00; G02B 23/16; F16M 11/08; F16M 11/18; F16M 11/205;
(Continued)

(56) References Cited

U.S. PATENT DOCUMENTS 3,942,865 A * 3/1976 Rand .................... G02B 23/165
359/430
4,202,110 A 5/1980 Kooi
(Continued)

FOREIGN PATENT DOCUMENTS

| CN | 102207381 A | 10/2011 |
|---|---|---|
| CN | 102866496 A | 1/2013 |

(Continued)

*Primary Examiner* — Eret C McNichols
(74) *Attorney, Agent, or Firm* — Chernoff, Vilhauer, McClung & Stenzel, LLP

(57) ABSTRACT

An equatorial mount having a base, a right ascension base, a right ascension shaft, a declination base, a declination shaft, and a mount-rotation mechanism, the declination base rotatable about a right ascension axis relative to the right ascension base, and the declination shaft rotatable about a declination axis relative to the declination axis, wherein the mount-rotation mechanism is engageable and disenagageable from one or the other of the right ascension shaft and the declination shaft, to apply torque between the declination base and that shaft when engaged and to permit relative rotation of the shaft and the declination base when disengaged.

17 Claims, 10 Drawing Sheets

(51) Int. Cl.
*F16M 11/18* (2006.01)
*F16M 11/20* (2006.01)
*F16M 11/22* (2006.01)
*F16M 13/02* (2006.01)

(52) U.S. Cl.
CPC ....... *F16M 11/205* (2013.01); *F16M 11/2057* (2013.01); *F16M 11/22* (2013.01); *F16M 13/022* (2013.01); *F16M 2200/022* (2013.01)

(58) Field of Classification Search
CPC .. F16M 11/2057; F16M 11/22; F16M 13/022; F16M 2200/022
See application file for complete search history.

(56) References Cited

U.S. PATENT DOCUMENTS

| | | | | |
|---|---|---|---|---|
| 4,929,118 | A | | 5/1990 | Anderson |
| 5,537,250 | A | * | 7/1996 | Masunaga ............... G02B 17/02 |
| | | | | 248/280.11 |
| 5,956,177 | A | * | 9/1999 | Nishikata ............. G02B 23/165 |
| | | | | 359/430 |
| 6,563,636 | B1 | * | 5/2003 | Baun ....................... G02B 23/16 |
| | | | | 318/266 |
| 2004/0136061 | A1 | | 7/2004 | Denpo et al. |
| 2008/0062515 | A1 | * | 3/2008 | Aniol .................... G02B 23/165 |
| | | | | 359/429 |
| 2012/0307356 | A1 | * | 12/2012 | Xu .......................... G02B 23/16 |
| | | | | 359/428 |
| 2013/0258459 | A1 | * | 10/2013 | Mao ..................... G02B 23/165 |
| | | | | 359/399 |
| 2014/0111853 | A1 | * | 4/2014 | Xu ....................... G02B 23/165 |
| | | | | 359/430 |
| 2018/0231876 | A1 | * | 8/2018 | Bradaschia ............ G02B 23/16 |
| 2020/0192076 | A1 | * | 6/2020 | Sun ..................... G02B 23/165 |

FOREIGN PATENT DOCUMENTS

| | | | | |
|---|---|---|---|---|
| CN | 202748534 | U | 2/2013 | |
| CN | 104019333 | A | 9/2014 | |
| CN | 203894470 | U | 10/2014 | |
| CN | 105674949 | A | 6/2016 | |
| CN | 107202568 | A | 9/2017 | |
| CN | 107270865 | A | 10/2017 | |
| CN | 105508446 | B | 6/2018 | |
| CN | 105627983 | B | 6/2018 | |
| DE | 10326412 | A1 * | 12/2004 | ........... G02B 23/165 |

* cited by examiner

EQUATORIAL MOUNT LOCKING DEVICE

REFERENCE TO RELATED APPLICATIONS

This application is a continuation-in-part of Patent Cooperation Treaty (PCT) application No. PCT/CN/2017/110652 having an international filing date of 13 Nov. 2017, which in turn claims priority from CN 201710637241.0 having a filing date of 31 Jul. 2017. All of the applications referenced in this paragraph are hereby incorporated herein by reference.

TECHNICAL FIELD

The present invention relates to an equatorial mount for supporting telescopes and/or other optical devices. Particular embodiments provide equatorial mounts with locking devices or clutches.

BACKGROUND

An equatorial mount is a common angle measurement instrument which is generally used with an astronomical telescope, and/or other optical device, to perform astronomical observations and provide scientific measurement data for astronomical phenomena and astronomical research.

Equatorial mounts operate on two axes, a right ascension axis and a declination axis. The right ascension axis can also be referred to as the hour angle axis; as commonly defined, the direction in which the hour angle increases is opposite to the direction in which the right ascension angle increases. Some equatorial mounts may be driven by motors operably connected to rotate parts of the equatorial mount around the right ascension and declination axes.

An equatorial mount typically performs actions to adjust compound angles in three-dimensional space to track celestial objects that appear to move through the night sky due to rotation of the earth. Consequently, there is a general desire that an equatorial mount be movable with relatively high precision, so that it is possible to precisely adjust an observation angle of a telescope, and achieve precise positioning and real-time tracking of celestial bodies. Despite the desirability of precision movement (e.g. when observing a particular celestial object), there is also a desire (in some circumstances) to move the equatorial mount over relatively large angular ranges relatively quickly. For example, such a desire may arise when a user is moving the equatorial mount to switch from observing a first celestial object to a second, different, celestial object.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In an embodiment of an equatorial mount for an optical instrument the equatorial mount comprises: a base; a right ascension base comprising a right ascension shaft elongated along a right ascension axis; a declination base rotatably mounted to the right ascension base for rotation about the right ascension axis relative to the right ascension base; a declination shaft rotatably mounted to the declination base for rotation about a declination axis; a mount-rotation mechanism; a locking mechanism for operably engaging the mount-rotation mechanism to at least one of the right ascension shaft and the declination shaft, the locking mechanism comprising: a locking member extendable into at least one of: a right ascension bore defined by the right ascension shaft in a direction parallel to the right ascension axis; and a declination bore defined by the declination shaft in a direction parallel to the declination axis; and at least one of: one or more right ascension locking blocks extending at least partially into the right ascension bore; and one or more declination locking blocks extending at least partially into the declination bore; the locking mechanism convertible between: a locked configuration wherein: the locking member is in a first position relative to the at least one of the right ascension bore and the declination bore; the locking member bears against the at least one of the one or more right ascension locking blocks and the one or more declination locking blocks to apply force thereto; the at least one of the one or more right ascension locking blocks and the one or more declination locking blocks in turn bear against the mount-rotation mechanism to apply force thereto; and at least one of: a transfer of force between the locking member, the one or more right ascension locking blocks and the mount-rotation mechanism causes the mount-rotation mechanism to operably engage the right ascension shaft such that a torque applied by the mount-rotation mechanism to the right ascension shaft causes relative rotation between the right ascension shaft and the declination base about the right ascension axis; and a transfer of force between the locking member, the one or more declination locking blocks and the mount-rotation mechanism causes the mount-rotation mechanism to operably engage the declination shaft such that a torque applied by the mount-rotation mechanism to the declination shaft causes relative rotation between the declination shaft and the declination base about the declination axis; an unlocked configuration wherein: the locking member is at a second position relative to the at least one of the right ascension bore and the declination bore; the force applied by the locking member to the at least one of the one or more right ascension locking blocks and the one or more declination locking blocks is reduced relative to the force in the locked configuration; and the force applied by the at least one of the one or more right ascension locking blocks and the one or more declination locking blocks to the mount-rotation mechanism is reduced relative to the force in the locked configuration.

In some such embodiments the equatorial mount may further comprise or be characterized in that one or more of: the locking member is axially extendable into the at least one of the right ascension bore and the declination bore, the first position is a first axial position relative to the at least one of the right ascension bore and the declination bore, and the second position is a second axial position relative to the at least one of the right ascension bore and the declination bore; when the locking mechanism is in the unlocked configuration, the reduced force applied by the locking member to the at least one of the one or more right ascension locking blocks and the one or more declination locking blocks and the reduced force applied by the at least one of the one or more right ascension locking blocks and the one or more declination locking blocks to the mount-rotation mechanism permit the mount-rotation mechanism to move freely of the at least one of the right ascension shaft and the declination shaft; a surface of the locking member comprises a locking-member inclined surface and a surface of each of the at least one of the one or more right ascension locking blocks and the one or more declination blocks comprises a locking-block inclined surface and wherein, in the first axial position, the locking member is positioned such that the locking-member inclined surface bears against the locking-block inclined surface of each of the at least one of the one or more right ascension locking blocks and the one or more declination locking blocks; axial translation of the locking member imparts force to the at least one of: the one or more right ascension locking blocks in a direction that extends from, and is orthogonal to, the right ascension axis; and the one or more declination locking blocks in a direction that extends from, and is orthogonal to, the declination axis; the locking member threadably engages a corresponding threaded bore-defining surface of the at least one of the right ascension shaft and the declination shaft to convert rotation of the locking member relative to the at least one of the right ascension shaft and the declination shaft into axial translation of the locking member relative to the at least one of the right ascension shaft and the declination shaft; the mount-rotation mechanism is supported by the declination base to thereby move with the declination base about the right ascension axis; the mount-rotation mechanism comprises a motor; the mount-rotation mechanism comprises a worm screw and a worm wheel, the worm screw connected to be driven by the motor and engaged with the worm wheel; in the locked configuration the at least one of the one or more right ascension locking blocks and the one or more declination locking blocks bear against the worm wheel; the at least one of the one or more right ascension locking blocks and the one or more declination locking blocks comprise an inner locking block and an outer locking block and wherein: the outer locking block is disposed adjacent to the inner locking block in a direction extending away from and orthogonal to at least one of the right ascension axis and the declination axis;

In an embodiment of an equatorial mount for an optical instrument, the equatorial mount comprises: a base; a right ascension base comprising a right ascension shaft elongated along a right ascension axis; a declination base rotatably mounted to the right ascension base for rotation about the right ascension axis relative to the right ascension base, a declination shaft rotatably mounted to the declination base for rotation about a declination axis; a mount-rotation mechanism; a pivot joint operably connected for pivoting the mount-rotation mechanism relative to the at least one of the right ascension shaft and the declination shaft between: an engaged configuration wherein the mount-rotation mechanism is located to transfer torque between the declination base and the at least one of the right ascension shaft and the declination shaft; and a disengaged configuration wherein the mount-rotation mechanism is located in a location where the declination base and the at least one of the right ascension shaft and the declination shaft are able to rotate freely relative to one another.

In some such embodiments the equatorial mount may further comprise or be characterized in that one or more of: the mount-rotation mechanism comprises a motor; the mount-rotation mechanism further comprises a worm screw, the worm screw connected to be driven by the motor and wherein at least one of the right ascension shaft and the declination shaft comprises a worm wheel fixedly connected to the at least one of the right ascension shaft and the declination shaft; in the engaged configuration the worm screw and the worm wheel are enmeshed to transmit torque from the worm screw to the worm wheel and in the disengaged configuration the worm wheel and worm screw are disengaged; a second mount-rotation mechanism, wherein the mount-rotation mechanism is engageable with the right ascension shaft, and the second mount-rotation mechanism is engageable with the declination shaft for applying torque to the declination shaft about the declination axis; the second mount-rotation mechanism comprising: a pivot joint for pivoting the second mount-rotation mechanism relative to the declination shaft between: an engaged configuration wherein the second mount-rotation mechanism is engaged with the declination shaft for applying torque to the declination shaft about the declination axis; and a disengaged configuration wherein the declination shaft rotates freely from the second mount-rotation mechanism; a pivot control mechanism movable between first and second pivot control mechanism positions, wherein in the first pivot control mechanism position, the pivot control mechanism forces the mount-rotation mechanism into one of the engaged or disengaged configurations and in the second pivot control mechanism position the pivot control mechanism permits the mount-rotation mechanism to return to an other of the engaged or disengaged configurations; the pivot control mechanism comprises a cam having a an internal portion with a wide dimension and a thin dimension, wherein in the first pivot control mechanism position the wide dimension forces the mount-rotation mechanism into the engaged configuration and in the second pivot control mechanism the thin dimension permits the mount-rotation mechanism to return to the disengaged configuration; a bias, the bias applying a force to bias the mount-rotation mechanism into one of the engaged and disengaged positions; the bias comprises a spring.

In an embodiment of an equatorial mount locking device, the equatorial mount locking device is characterized in that it comprises: first and second locking blocks; a declination locking handle; a declination locking member; copper pads; a declination worm wheel locking nut; a declination shaft locking nut; an hour angle locking handle; a lens tube seat; a declination base; a declination worm; a declination worm wheel; an right ascension base; an hour angle worm; an hour angle worm wheel; an right ascension base bearing; a declination shaft; and a right ascension shaft; wherein: a declination shaft installation cavity is designed inside the declination base; the declination shaft is installed in a fixed manner inside the declination base; a locking through-hole is designed radially at an inner wall of the declination shaft; a locking block assembly is disposed inside the locking through-hole; the declination locking member takes the form of a conical block; a locking member installation cavity is designed at an upper end of the declination shaft; the declination locking member is placed in the locking member installation cavity of the declination shaft; the declination locking handle is designed above the declination locking member; the declination locking handle is connected in a fixed manner to the declination locking member; the lens tube seat is connected in a fixed manner to the declination locking handle; the right ascension base bearing is disposed and installed above and below the declination shaft; the right ascension base bearing is passed through by the declination shaft and connected in a fixed manner to the declination shaft; the declination worm wheel locking nut is designed above the upper right ascension base bearing; the declination shaft locking nut is designed below the lower right ascension base bearing; the declination worm wheel is disposed above the declination worm wheel locking nut; moreover, the copper pads are designed between the declination worm wheel and the declination worm wheel locking nut and between the declination worm wheel and the declination shaft; the declination worm wheel is passed through by the declination shaft and connected in a fixed manner to the declination shaft; the declination worm is designed at a left side of the declination worm wheel and the declination worm is in meshed connection with the declination worm wheel; two connecting frames are designed at two ends below the declination base; the right ascension base is located below the declination base; the right ascension shaft is connected in a fixed manner to the right ascension base by means of a positioning assembly; the right ascension shaft runs through the connecting frames at the two ends below the declination base and through the right ascension base; the right ascension base bearing is designed at positions of convergence of two ends of the right ascension shaft and the connecting frames of the declination base; a fixed connection exists between the right ascension base bearing and the right ascension shaft; the declination base and the right ascension base are both connected together by means of the right ascension shaft; an hour angle locking handle installation cavity is designed inside the right ascension shaft; the hour angle locking handle is installed in the hour angle handle installation cavity; a lower end of the hour angle locking handle is conical; a locking through-hole is designed inside the right ascension shaft; a locking block assembly is disposed inside the locking through-hole; a right end of the right ascension shaft passes through the hour angle worm wheel; the hour angle worm is designed above the hour angle worm wheel; the hour angle worm wheel is in meshed connection with the hour angle worm; and the copper pads are designed at left and right sides respectively between the hour angle worm wheel and the right ascension shaft.

In some such embodiments, equatorial mount locking device may be characterized in that: the locking block assembly comprises the first and second locking blocks; the first locking block is placed in the locking through-hole of the inner wall of the declination shaft; a recess is designed in the first locking block; the recess is trapezoidal, with a wide recess mouth and a narrow recess bottom; the second locking block takes the form of a trapezoidal block; the second locking block can precisely fit the recess of the first locking block, and a longer face of the trapezoidal block of the first locking block is designed as an inclined face, precisely fitting a cylindrical inclined edge at a lower end of the declination locking member; and electric motors are disposed at left and right sides respectively of the declination shaft; a declination worm assembly and an hour angle worm assembly are connected to the two electric motors respectively.

In some embodiments an equatorial mount for an optical instrument is provided, the equatorial mount comprising: a base; a right ascension base comprising a right ascension shaft elongated along a right ascension axis; a declination base rotatably mounted to the right ascension base for rotation about the right ascension axis relative to the right ascension base; a declination shaft rotatably mounted to the declination base for rotation about a declination axis; a mount-rotation mechanism; a locking mechanism for operably engaging the mount-rotation mechanism to the right ascension shaft, the locking mechanism comprising: a locking member extendable into a right ascension bore defined by the right ascension shaft in a direction parallel to the right ascension axis; one or more right ascension locking blocks extending at least partially into the right ascension bore; the locking mechanism convertible between: a locked configuration wherein: the locking member is in a first position relative to the right ascension bore; the locking member bears against the one or more right ascension locking blocks to apply force thereto; the one or more right ascension locking blocks in turn bear against the mount-rotation mechanism to apply force thereto; and a transfer of force between the locking member, the one or more right ascension locking blocks and the mount-rotation mechanism causes the mount-rotation mechanism to operably engage the right ascension shaft such that a torque applied by the mount-rotation mechanism to the right ascension shaft causes relative rotation between the right ascension shaft and the declination base about the right ascension axis; and an unlocked configuration wherein: the locking member is at a second position relative to the right ascension bore; the force applied by the locking member to the one or more right ascension locking blocks is reduced relative to the force in the locked configuration; and the force applied by the at one or more right ascension locking blocks to the mount-rotation mechanism is reduced relative to the force in the locked configuration.

In some embodiments an equatorial mount for an optical instrument is provided, the equatorial mount comprising: a base; a right ascension base comprising a right ascension shaft elongated along a right ascension axis; a declination base rotatably mounted to the right ascension base for rotation about the right ascension axis relative to the right ascension base; a declination shaft rotatably mounted to the declination base for rotation about a declination axis; a mount-rotation mechanism; a locking mechanism for operably engaging the mount-rotation mechanism to the declination shaft, the locking mechanism comprising: a locking member extendable into a declination bore defined by the declination shaft in a direction parallel to the declination axis; one or more declination locking blocks extending at least partially into the declination bore; the locking mechanism convertible between: a locked configuration wherein: the locking member is in a first position relative to the declination bore; the locking member bears against the one or more declination locking blocks to apply force thereto; the one or more declination locking blocks in turn bear against the mount-rotation mechanism to apply force thereto; and a transfer of force between the locking member, the one or more declination locking blocks and the mount-rotation mechanism causes the mount-rotation mechanism to operably engage the declination shaft such that a torque applied by the mount-rotation mechanism to the declination shaft causes relative rotation between the declination shaft and the declination base about the declination axis; and an unlocked configuration wherein: the locking member is at a second position relative to the declination bore; the force applied by the locking member to the one or more declination locking blocks is reduced relative to the force in the locked configuration; and the force applied by the at one or more declination locking blocks to the mount-rotation mechanism is reduced relative to the force in the locked configuration.

In some embodiments an equatorial mount for an optical instrument is provided, the equatorial mount comprising: a base; a right ascension base comprising a right ascension shaft elongated along a right ascension axis; a declination base rotatably mounted to the right ascension base for rotation about the right ascension axis relative to the right ascension base, a declination shaft rotatably mounted to the declination base for rotation about a declination axis; a mount-rotation mechanism; a pivot joint operably connected for pivoting the mount-rotation mechanism relative to the right ascension shaft between: an engaged configuration wherein the mount-rotation mechanism is located to transfer torque between the declination base and the right ascension shaft; and a disengaged configuration wherein the mount-rotation mechanism is located in a location where the declination base and the right ascension shaft are able to rotate freely relative to one another.

In some embodiments an equatorial mount for an optical instrument is provided, the equatorial mount comprising: a base; a right ascension base comprising a right ascension shaft elongated along a right ascension axis; a declination base rotatably mounted to the right ascension base for rotation about the right ascension axis relative to the right ascension base, a declination shaft rotatably mounted to the declination base for rotation about a declination axis; a mount-rotation mechanism; a pivot joint operably connected for pivoting the mount-rotation mechanism relative to the declination shaft between: an engaged configuration wherein the mount-rotation mechanism is located to transfer torque between the declination base and the declination shaft; and a disengaged configuration wherein the mount-rotation mechanism is located in a location where the declination base and the declination shaft are able to rotate freely relative to one another.

In an embodiment of an equatorial mount locking device, the equatorial mount is characterized in that it comprises one or more locking blocks, a declination locking handle, a declination locking member, copper pads, a declination worm wheel locking nut, a declination shaft locking nut, an hour angle locking handle, a optical instrument seat, a declination base, a declination worm, a declination worm wheel, an right ascension base, an hour angle worm, an hour angle worm wheel, an right ascension base bearing, a declination shaft and a right ascension shaft; a declination shaft installation cavity is designed inside the declination base; the declination shaft is installed in a fixed manner inside the declination base; a locking through-hole is designed radially at an inner wall of the declination shaft; a locking block assembly is disposed inside the locking through-hole; the declination locking member takes the form of a conical block; a locking member installation cavity is designed at an upper end of the declination shaft; the declination locking member is placed in the locking member installation cavity of the declination shaft; the declination locking handle is designed above the declination locking member; the declination locking handle is connected in a fixed manner to the declination locking member; the optical instrument seat is connected in a fixed manner to the declination locking handle; the right ascension base bearing is disposed and installed above and below the declination shaft; the right ascension base bearing is passed through by the declination shaft and connected in a fixed manner to the declination shaft; the declination worm wheel locking nut is designed above the upper right ascension base bearing; the declination shaft locking nut is designed below the lower right ascension base bearing; the declination worm wheel is disposed above the declination worm wheel locking nut; moreover, the copper pads are designed between the declination worm wheel and the declination worm wheel locking nut and between the declination worm wheel and the declination shaft; the declination worm wheel is passed through by the declination shaft and connected in a fixed manner to the declination shaft; the declination worm is designed at a left side of the declination worm wheel; and the declination worm is in meshed connection with the declination worm wheel; the declination base is a cuboid; two connecting frames are designed at two ends below the declination base; the right ascension base is located below the declination base; the right ascension shaft is connected in a fixed manner to the right ascension base by means of a positioning assembly; the right ascension shaft runs through the connecting frames at the two ends below the declination base and through the right ascension base; the right ascension base bearing is designed at positions of convergence of two ends of the right ascension shaft and the connecting frames of the declination base; a fixed connection exists between the right ascension base bearing and the right ascension shaft; the declination base and the right ascension base are both connected together by means of the right ascension shaft; an hour angle locking handle installation cavity is designed inside the right ascension shaft; the hour angle locking handle is installed in the hour angle locking handle installation cavity; a lower end of the hour angle locking handle is conical; a locking through-hole is designed inside the right ascension shaft; a locking block assembly is disposed inside the locking through-hole; a right end of the right ascension shaft passes through the hour angle worm wheel; the hour angle worm is designed above the hour angle worm wheel; the hour angle worm wheel is in meshed connection with the hour angle worm; and the copper pads are designed at left and right sides respectively between the hour angle worm wheel and the right ascension shaft.

The locking block assembly may divided into pairs of locking blocks; a first locking block is placed in the locking through-hole of the inner wall of the declination shaft; a recess is designed in the first locking block; the recess is trapezoidal, with a wide recess mouth and a narrow recess bottom; the second locking block takes the form of a trapezoidal block; the second locking block can precisely fit the recess of the first locking block, and a longer face of the trapezoidal block of the second locking block is designed as an inclined face, precisely fitting a cylindrical inclined edge at a lower end of the declination locking member.

Electric motors are disposed at a left side of the declination shaft and above and to the right of the right ascension shaft respectively; a declination worm assembly and an hour angle worm assembly are connected to the two electric motors respectively.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1A:
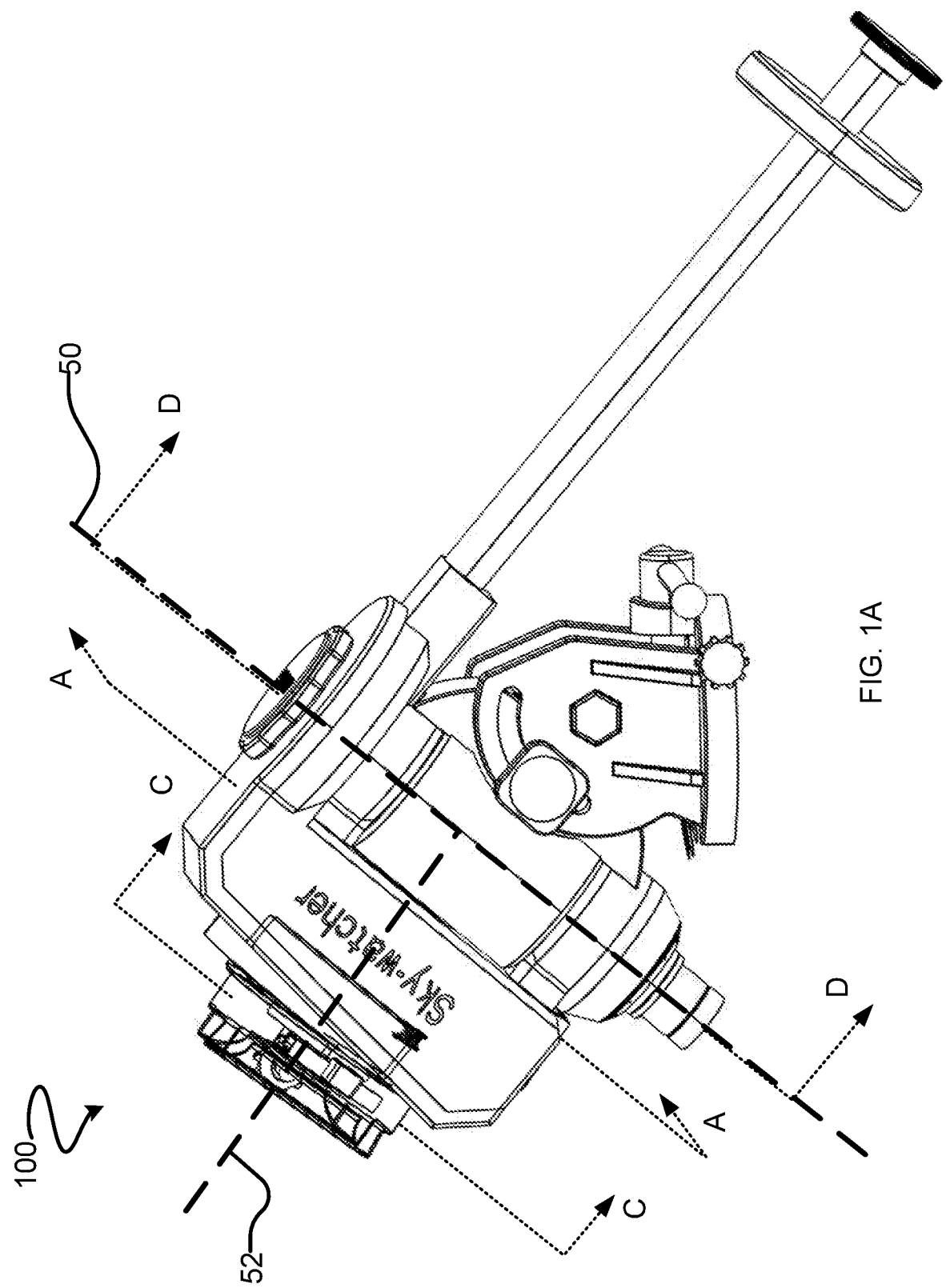
FIG. 1A is a perspective view of an example embodiment of an equatorial mount showing the planes of three selected cross-sections.
Figure 1B:
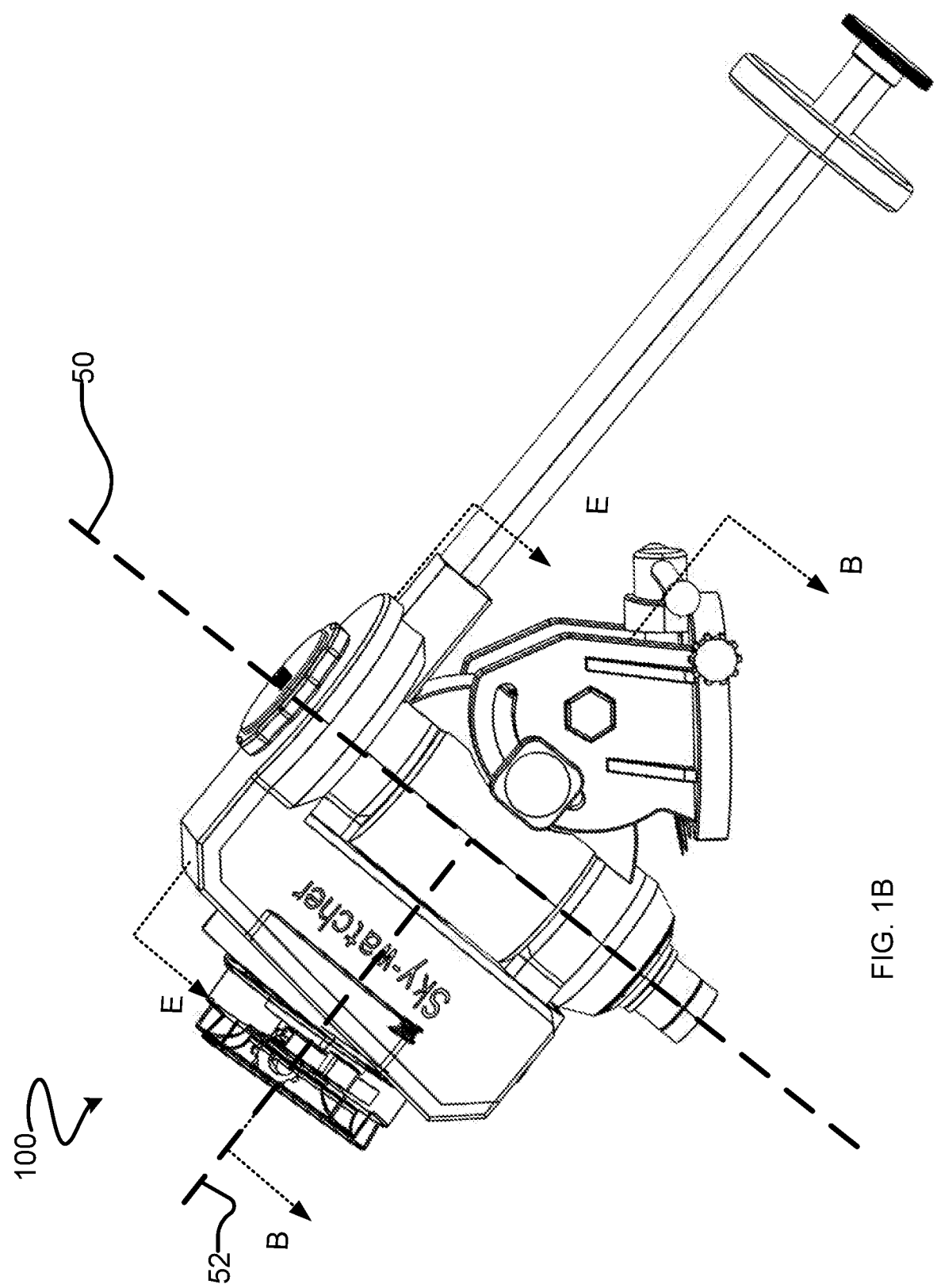
FIG. 1B is a perspective view of the FIG. 1A equatorial mount showing the planes of two further cross-sections.

Aspects of the present invention relate to an equatorial mount with locking mechanisms to allow one or more mount-rotation mechanism to be engaged or disengaged to rotate elements of the equatorial mount about corresponding rotational axes. When the mount-rotation mechanism is engaged a motor may be used to rotate an element of the mount about its corresponding rotational axis. When the mount-rotation mechanism is disengaged, a user can rotate an element of the mount about its corresponding rotational axis independently of at least part of the mount-rotation mechanism.

The equatorial mount comprises a base, a right ascension base, a declination base, a declination shaft, a mount-rotation mechanism, and a counterweight assembly. When the an optical device (e.g. a telescope) is mounted on the equatorial mount, the equatorial mount may be used to rotate the optical device about a right ascension axis and a declination axis. To permit this rotation of the optical device, the declination base is rotatable about the right ascension axis relative to the right ascension base and the declination shaft is rotatable about the declination axis relative to the right ascension base. Drive systems of the equatorial mount may be engagable and disengageable from shaft structures elongated along the declination and right ascension axes.

Broadly, two engagement systems for an equatorial mount are described in detail below. At a high level, a first system may operate by mechanisms in a bore of a shaft, engaging a mount-rotation mechanism to permit a transfer of torque between the declination base and the shaft around the corresponding axis of the shaft and disengaging to permit relative rotation of the declination base and the shaft around the corresponding axis of the shaft. The second system may operate by a mount-rotation mechanism being moved to engage a shaft to permit a transfer of torque between the declination base and the shaft around the corresponding axis of the shaft and disengaging to permit relative rotation (free of at least a portion of the mount-rotation mechanism) between the declination base and the shaft around the corresponding axis of the shaft. Either mechanism may be used independent of the other system to allow a drive system and shaft to be disengaged and engaged as desired.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Shaft to Declination Base Engagement

Referring to FIGS. 2-6, an equatorial mount locking device comprises a locking sub-blocks 10, a locking sub-blocks 12, a declination locking handle 20, a declination locking member 19, copper pads 8, a declination worm wheel locking nut 7, a declination shaft locking nut 4, an hour angle locking handle 18, an optical instrument seat 11, a declination base 14, a declination worm screw 5, a declination worm wheel 13, a right ascension base 1, a right ascension worm screw 16, a right ascension worm wheel 17, a right ascension base bearing 3, a declination shaft 9 and a right ascension shaft 2.

An installation cavity for the declination shaft 9 is designed inside the declination base 14; the declination shaft 9 is installed inside the declination base 14; a locking through-hole is designed radially at an inner wall of the declination shaft 9; a locking block assembly is disposed inside the locking through-hole; the declination locking member 19 takes the form of a conical block; in an embodiment a locking member installation cavity is designed at an upper end of the declination shaft 9; locking sub-blocks 10B, 12B are placed in the locking member installation cavity of the declination shaft; the declination locking handle 20 is positioned above the declination locking member 19; the declination locking handle 20 is connected to the declination locking member 19; the optical instrument seat 11 is connected to the declination locking handle 20; a set of base bearings 3 are disposed and installed above and below the declination shaft 9; base bearings 3 are passed through by the declination shaft 9 and connected to the declination shaft 9; the declination worm wheel locking nut 7 is designed above an upper base bearing 3; the declination shaft locking nut 4 is designed below a lower base bearing 3; the declination worm wheel 13 is disposed above the declination worm wheel locking nut 7; moreover, the copper pads 8 are designed between the declination worm wheel 13 and the declination worm wheel locking nut 7 and between the declination worm wheel 13 and the declination shaft 9; the declination worm wheel 13 is passed through by the declination shaft 9 and connected to the declination shaft 9; the declination worm screw 5 is designed at a left side of the declination worm wheel 13; and the declination worm screw 5 is in meshed connection with the declination worm wheel 13.

The declination base 14 may be approximately cuboid in shape. Two connecting frames are designed at two ends below the declination base 14; the right ascension base 1 is located below the declination base 14; the right ascension shaft 2 is connected to the right ascension base; the right ascension shaft 2 runs through the connecting frames at the two ends below the declination base 14 and through the right ascension base 1; the bearings 3 are designed at positions of convergence of two ends of the right ascension shaft 2 and the connecting frames of the declination base 14; bearings 3 are configured around the right ascension shaft 2; the declination base 14 and the right ascension base 1 are both connected together by means of the right ascension shaft 2; a right ascension locking handle installation cavity is designed inside the right ascension shaft 2; the right ascension locking handle 18 is installed in the hour angle handle installation cavity; a lower end of the right ascension locking handle 18 is conical; a locking through-hole is designed inside the right ascension shaft 2; a locking block assembly is disposed inside the locking through-hole; a right end of the right ascension shaft 2 passes through the right ascension worm wheel 17; the right ascension worm 16 is designed above the right ascension worm wheel; the right ascension worm wheel 17 is in meshed connection with the right ascension worm 16; and the copper pads 8 are designed at left and right sides respectively between the right ascension worm wheel 17 and the right ascension shaft 2.

The locking block assembly is divided into locking sub-blocks 10 and the locking sub-blocks 12; the locking sub-blocks 10B is placed in the locking through-hole of the inner wall of the declination shaft; a recess is designed in the locking sub-block 10B; the recess is trapezoidal, with a wide recess mouth and a narrow recess bottom; the locking sub-block 12B takes the form of a trapezoidal block; the locking sub-block 12B can precisely fit the recess of the locking sub-block 10B, and a longer face of the trapezoidal block of the locking sub-block 12B is designed as an inclined face, precisely fitting a conical inclined edge at a lower end of the declination locking member.

Electric motors are disposed at left and right sides respectively of the declination shaft; a declination worm assembly and an hour angle worm assembly are connected to the two electric motors respectively.

Figure 2:
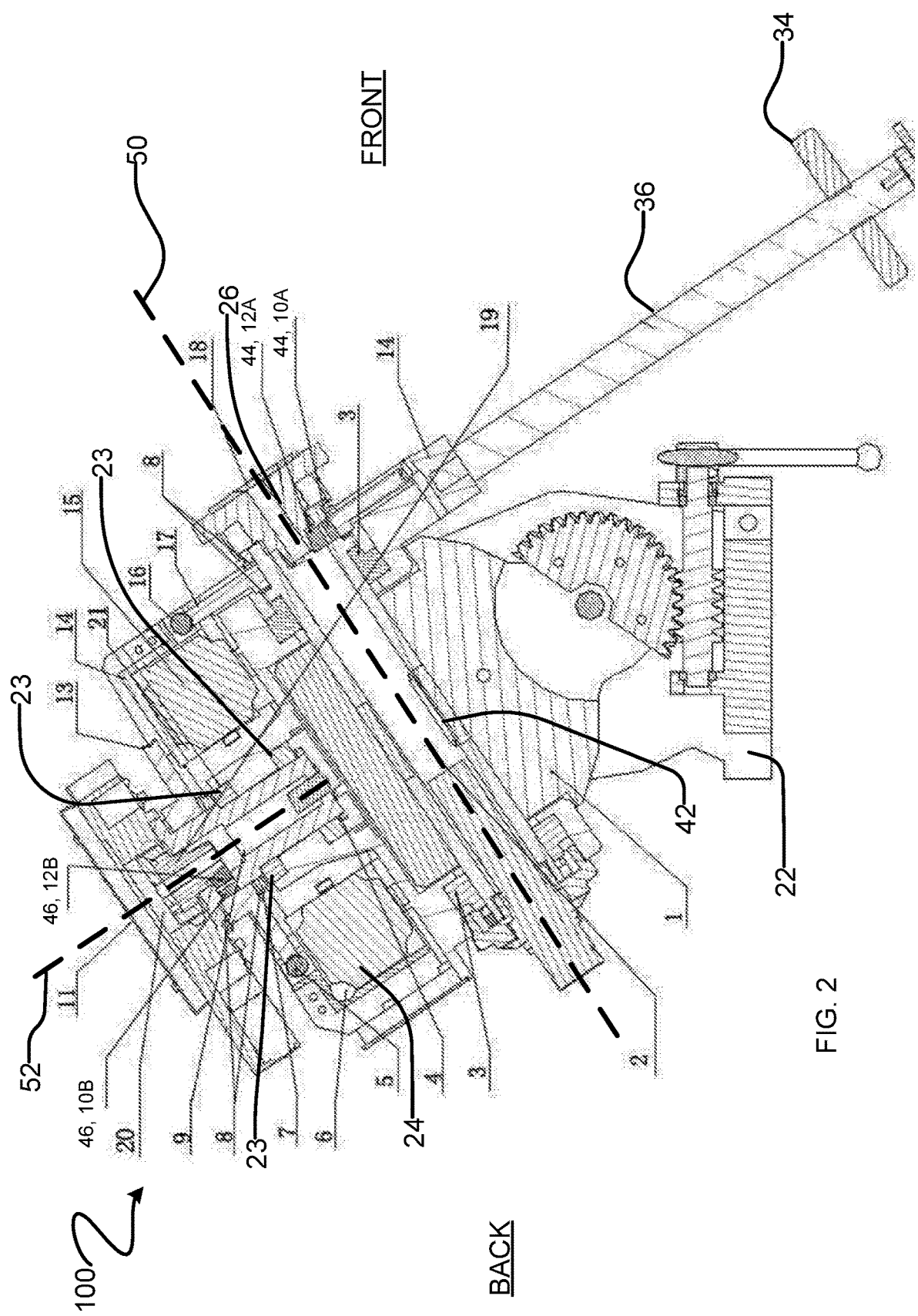
FIG. 2 is a cross-sectional view of the FIG. 1A equatorial mount taken through the centre of the equatorial mount along the line A-A, schematically illustrating elements of equatorial mount.
Figure 3:
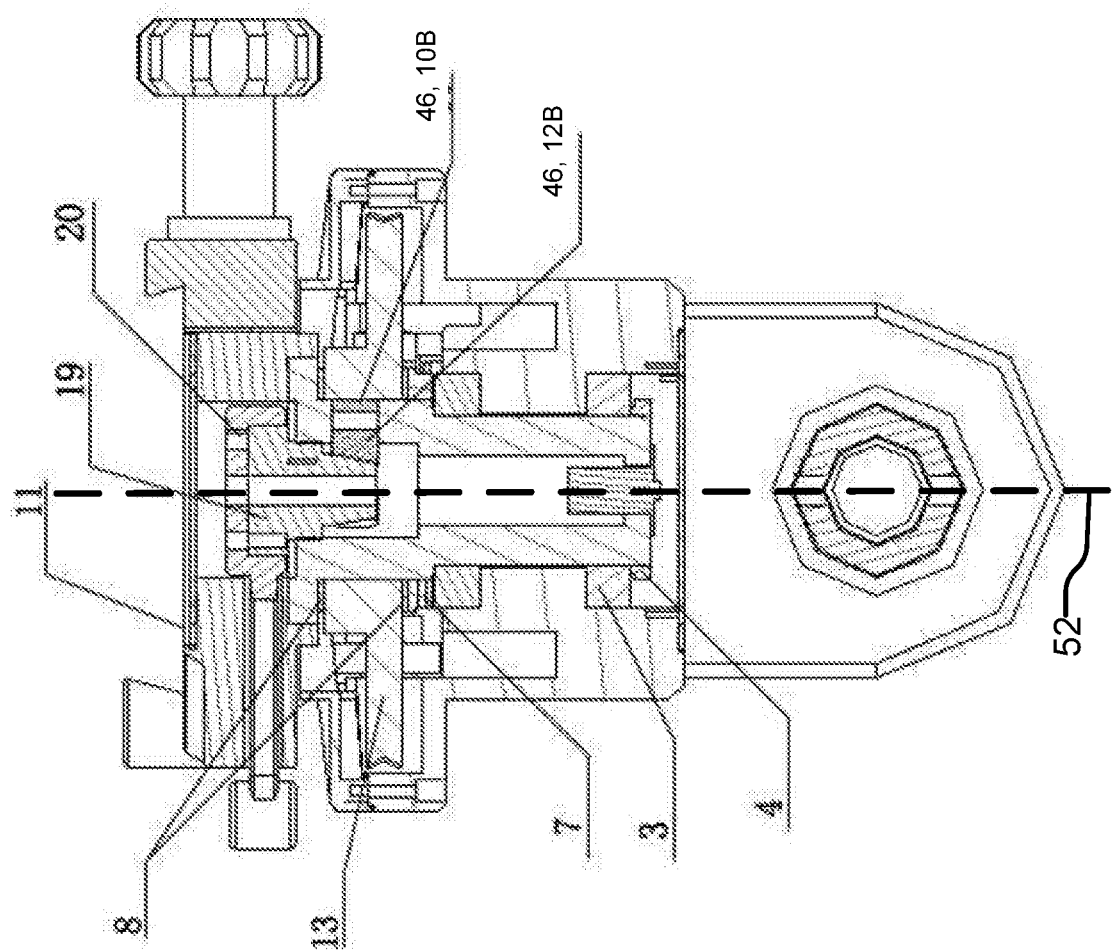
FIG. 3 is a cross-section view of the FIG. 1A equatorial mount taken along the line B-B, schematically illustrating elements of the declination base.
Figure 4:
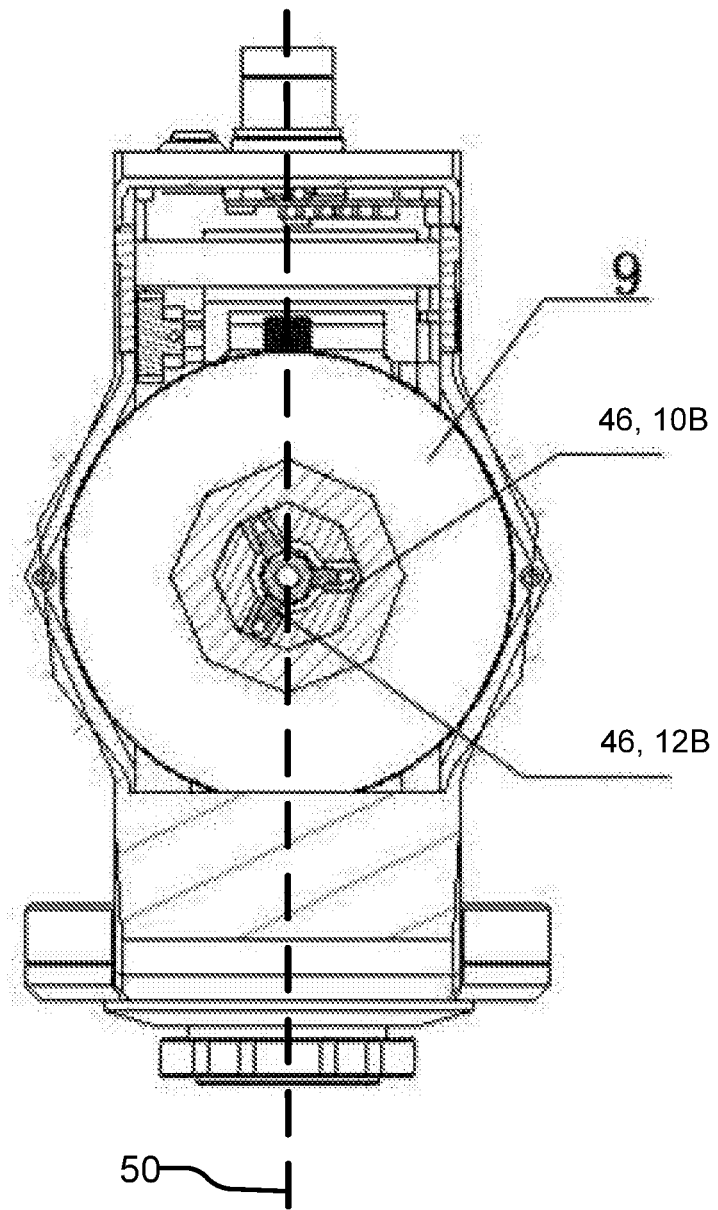
FIG. 4 is a cross-section view of the FIG. 1A equatorial mount taken along the line C-C, schematically illustrating elements of a locking mechanism in a declination shaft.
Figure 5:
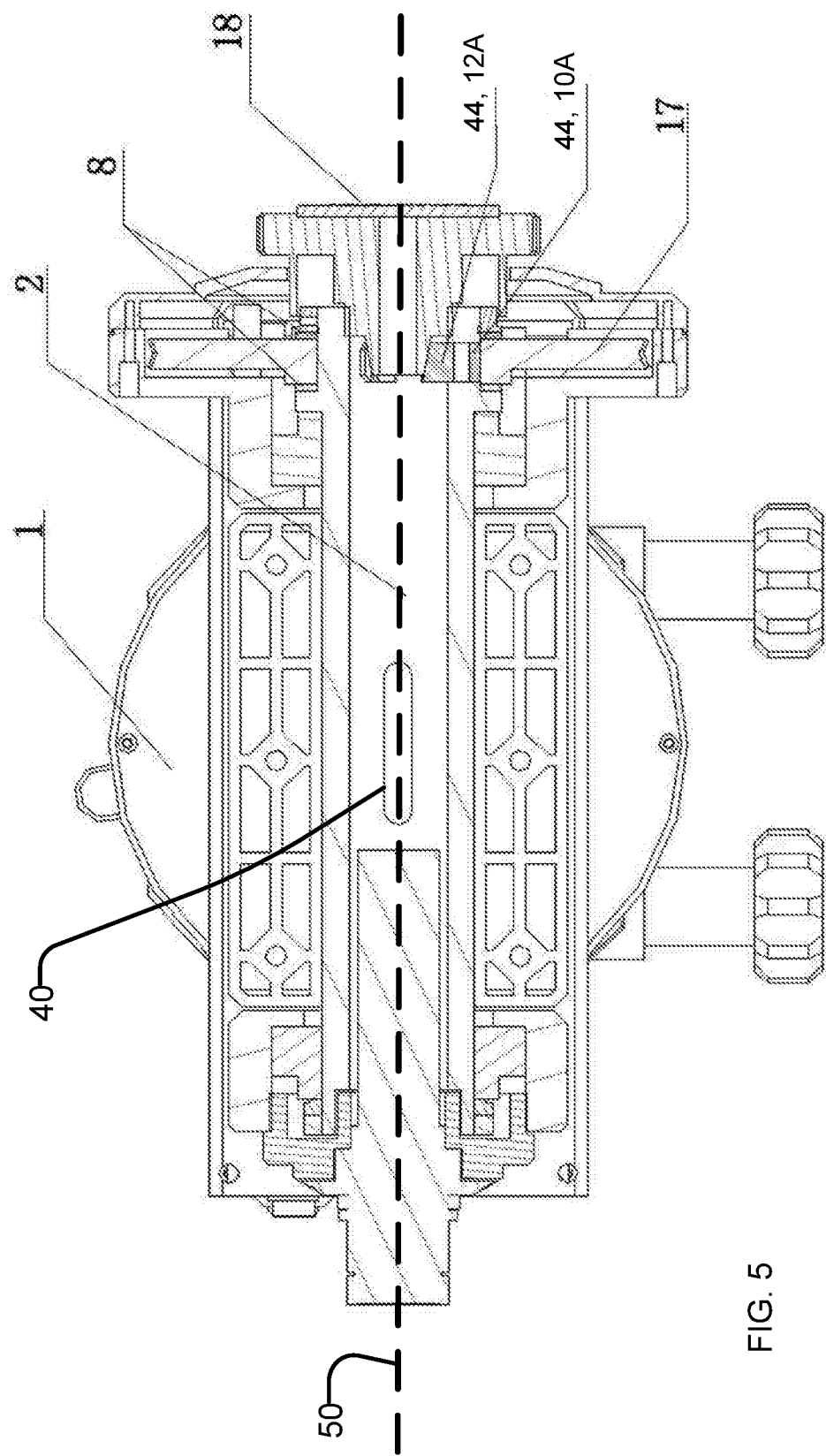
FIG. 5 is a cross-section view of the FIG. 1A equatorial mount taken along the line D-D, schematically illustrating elements along the length of a right ascension shaft.
Figure 6:
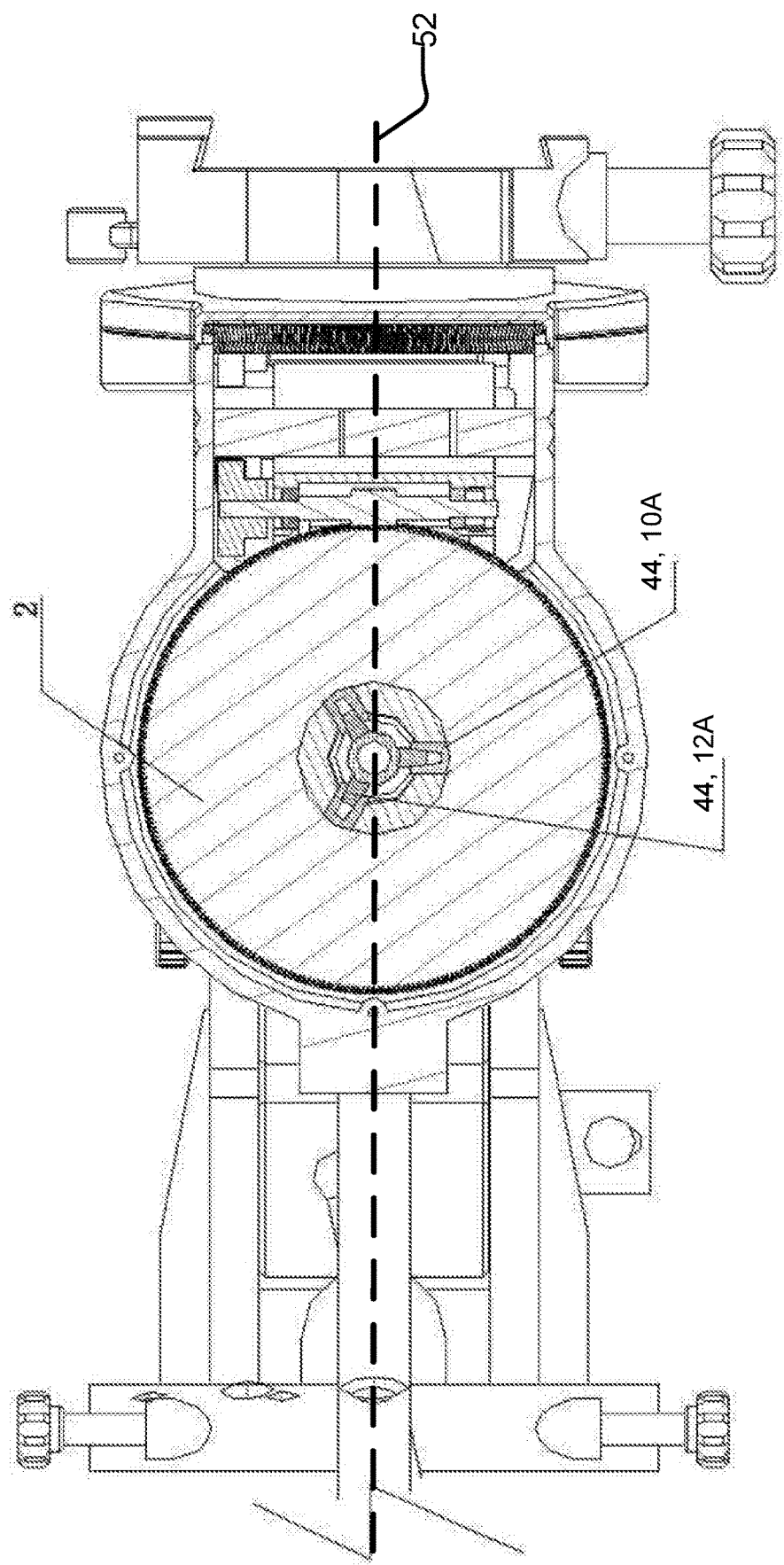
FIG. 6 is a cross-section view of the FIG. 1A equatorial mount taken along the line E-E, illustrating elements of a locking mechanism in a right ascension shaft.
Figure 7:
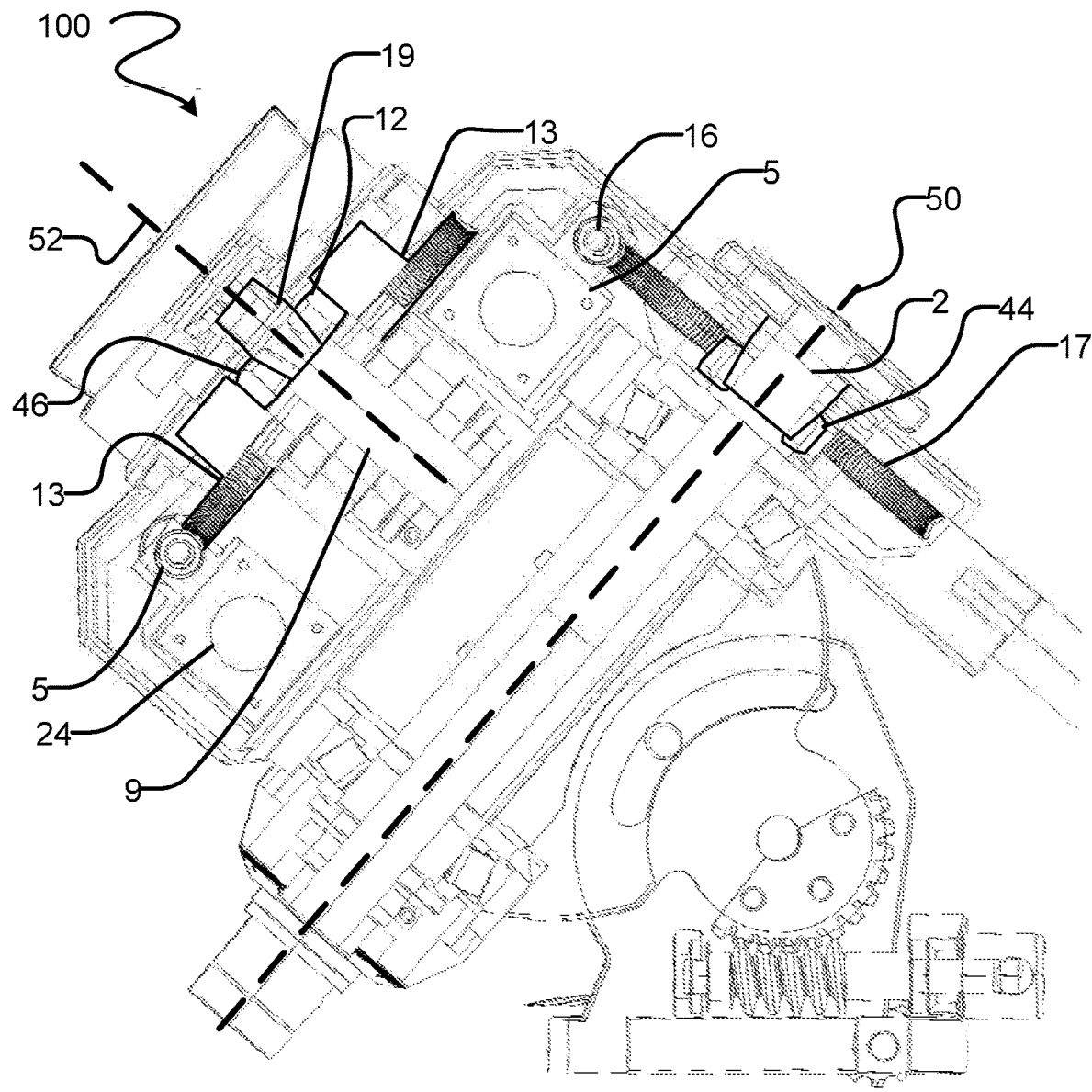
FIG. 7 is a cross-sectional view of another example embodiment of an equatorial mount in which locking blocks are unitary in the radial direction.

Generally, FIGS. 1 to 6 show an embodiment of equatorial mount 100. FIG. 1A is a perspective view of equatorial mount 100 showing three selected cross-sections. FIG. 1B is a perspective view of the equatorial mount of FIG. 1A showing two further cross-sections. FIG. 2 is a cross-sectional view of equatorial mount 100 taken through the centre of equatorial mount 100 along the line A-A, schematically illustrating elements of equatorial mount 100. FIG. 3 is a cross-section view of equatorial mount 100 along the line B-B, schematically illustrating elements of the declination base. FIG. 4 is a cross-section view of equatorial mount 100 along the line C-C, schematically illustrating elements of a locking mechanism in a declination shaft. FIG. 5 is a cross-section view of equatorial mount 100 along the line D-D schematically illustrating elements along the length of a right ascension shaft. Finally, FIG. 6 is a cross-section view of equatorial mount along the line E-E illustrating elements of a locking mechanism in a right ascension shaft.

Referring to FIG. 2, equatorial mount 100 comprises a base 22. Base 22 typically comprises components (not expressly described) for mounting to a tripod and may provide a mechanism to adjust the altitude of the remainder of equatorial mount 100. In such embodiments, a right ascension base 1 is rotatably engaged with base 22 through the altitude adjustment mechanism (not expressly enumerated). Right ascension base 1 comprises a right ascension shaft 2 that extends at least partially within a cavity of right ascension base 1. Right ascension shaft 2 extends along a right ascension axis 50 which may also be called an hour angle axis. Right ascension shaft 2 is fixed to right ascension base 1 by a positioning assembly. In the embodiment shown, the positioning assembly comprises a cavity 40 (most clearly illustrated in FIG. 5) in a section of right ascension shaft 2 and a protrusion 42 (most clearly illustrated In FIG. 2) from right ascension base 1. Protrusion 42 prevents relative rotation between right ascension base 1 and right ascension shaft 2.

A declination base 14 is rotatably connected to right ascension shaft 2 for rotation relative to right ascension shaft 2 and right ascension base 1. Portions of declination base 14 may extend around portions of right ascension shaft 2 in the form of one or more tubular sleeves extending along right ascension axis 50 and having corresponding bores into which right ascension shaft 2 may be axially inserted to thereby provide connections between declination base 14 and right ascension shaft 2. Bearings 3 may be positioned at one or more of the connections between declination base 14 and right ascension shaft 2 to assist in permitting relative rotation of the two parts about right ascension axis 50. Together, the cavity in right ascension base 1, the sleeves of declination base 14, and right ascension shaft 2 at least partially define a bore within the right ascension base.

A declination shaft 9 is rotatably mounted to declination base 14 and extends at least partially into declination base 14 along the declination axis 52. Declination shaft 9 at least partially defines a bore within the declination base. Declination shaft 9 is rotatable about declination axis 52 within declination base 14. Bearings 23 between declination base 14 and declination shaft 9 may further assist in permitting relative rotation between declination base 14 and declination shaft 9.

At an upper end of declination shaft 9 an optical instrument seat 11 provides a structure on which an optical instrument (not shown) such as a telescope may be mounted. The mounting of a telescope may be by means commonly understood in the art. In this arrangement, rotation of declination shaft 9 about declination axis 52 rotates the telescope through angles of declination. Rotation of declination base 14 about the right ascension shaft 2 and right ascension axis 50 rotates declination base 14, declination shaft 9 and the telescope through degrees of the hour angle (equivalently, degrees of right ascension). Since these angles are measured in perpendicular directions, the combination of rotation through both angles may allow a user to survey the sky.

Equatorial mount 100 comprises one or more mount-rotation mechanisms 6, 21. Mount-rotation mechanisms may be housed (at least partially) within declination base 13. Mount-rotation mechanisms 6, 21 are engageable with corresponding shafts 2, 9 to drive rotation of the engaged shafts. Each mount-rotation mechanism may comprise, for example, a motor 15, 24, a worm screw 16, 5 and a worm wheel 17, 13. Conventionally, a worm wheel may also be referred to as a worm gear. Motors 15, 24 are connected to drive worm screws 16, 5. Rotation of worms screws 16, 5 rotates worm wheels 17, 13. In the embodiment shown in FIGS. 1-7, worm wheels 17, 13 are in turn engagable to corresponding shafts 2, 9 through locking mechanisms. In a second embodiment described further below and illustrated in FIGS. 8 and 9, worm wheels 17, 13 are fixedly connected to their corresponding shafts 2, 9, and worm screws 16, 5 are engagable to worm wheels 17, 13 through a pivoting mechanism.

While a mount-rotation mechanism comprising motor and worm drive is described here, other mount-rotation mechanisms may be applied. In an embodiment, the mount-rotation mechanism could comprise a hand crank. In some embodiments, the worm drive could be replaced by other types of power trains, such as a bevel gear.

For each mount-rotation mechanism 15, 24, there is a corresponding locking mechanism. In the illustrated embodiment of FIGS. 1-7, each locking mechanism comprises a locking member 26, 19, and one or more locking blocks 44, 46. Each locking member 26, 19 extends at least partially into corresponding shafts 2, 9. Locking members 26, 19 are movable between a locked configuration and an unlocked configuration. In the locked configuration, locking members 26, 19 apply force to locking blocks 44, 46 which in turn apply force to mount-rotation mechanisms 15, 24 to thereby permit the application of torque between mount-rotation mechanisms 15, 24 and their corresponding shafts 2, 9. In the unlocked configuration, the force applied by locking members 26, 19 to locking blocks 44, 46 is reduced and/or released, and/or the force applied by locking blocks 44, 46 to mount-rotation mechanisms 15, 24 is reduced and/or released, thereby permitting relative rotation of mount-rotation mechanisms 15, 24 and corresponding shafts 2, 9—e.g. in the unlocked position, shafts 2, 9 may rotate independently (or at least partially independently) from mount-rotation mechanisms 15, 24. It is not necessary for complete freedom of movement for shafts 2, 9 when the locking mechanisms are in the unlocked configuration. For example, the reduced force between locking blocks 44, 46 and mount-rotation mechanisms 15, 24 may comprise some amount of contact and sliding friction.

In some embodiments, rotation of a locking handle 18, 20 causes axial movement of corresponding locking member 26, 19 within corresponding shaft 2, 9. The axial movement may be caused by the a threaded surface of the locking handle or locking member engaging a corresponding threaded surface of the shaft. Each locking member 26, 19 comprises an inclined, conical or frustro-conical surface at an end of locking member 26, 19, e.g. such that tangent lines along the inclined, conical or frustro-conical surface which intersect the axis of corresponding shaft 2, 9 intersect at an acute angle. Axial movement of locking member 26, 19 may cause the inclined surface at an end of each locking member to bear against an interior inclined face of a locking block 44, 46. Inclined faces of locking blocks 44, 46 may conform to inclined surfaces of locking members 26, 19. Each locking block 44, 46 may extend at least partially into the corresponding bore of one of right ascension shaft 2 and declination shaft 9, so that the inclined surfaces of locking blocks 44, 46 may engage the corresponding inclined surfaces of locking members 26, 19.

In some embodiments, as shown for example in FIGS. 2 through 6, each locking block may comprise pluralities of locking sub-blocks. For example, right ascension locking blocks 44 may comprise inner locking sub-block 12A and outer locking sub-block 10A and declination locking blocks 46 may comprise inner locking sub-block 12B and outer locking sub-block 10B. Each pair of locking blocks may be disposed adjacent to each other along a radial direction, i.e. in a direction extending away from and orthogonal to the axis of the bore in which they are at least partially disposed. In some embodiments, locking blocks may be unitary in the radial direction, such as locking blocks 44, 46 shown in FIG. 7. In the embodiment shown in FIGS. 2-6 adjacent sets of locking sub-blocks 10A and 12A, 10B and 12B are shaped to nest within each other radially. When locking member 26 presses against the inclined surface of locking blocks 44, locking block 12A is pressed outward against locking block 10A which presses in turn against an interior face of corresponding worm wheel 17. When locking member 19 presses against the inclined surface of locking blocks 46, locking block 12B is pressed outward against locking block 10B which presses in turn against an interior face of corresponding worm wheel 13.

In some embodiments, there may be three pairs of locking blocks 44, 46 per shaft, for example as shown in FIGS. 4 and 6. In other embodiments not shown in the figures, there may be one pair of locking blocks 44, 46 per shaft, two pairs of locking blocks per shaft, or four or more pairs of locking blocks per shaft. In some embodiments, pairs of locking blocks 44, 46 are distributed uniformly and circumferentially around their corresponding shaft. In embodiments similar to that shown in FIG. 7, in which locking blocks are unitary in the direction extending away from and orthogonal to their corresponding shaft, there may be one, two, three or more locking blocks 44, 46 per shaft.

In some embodiments locking members 26, 19 may move axially without rotation of a corresponding locking handle 18, 20. For example, locking members 26, 19 can be pushed in axially directly, such as by a piston. Such a piston could employ hydraulic or pneumatic pressure applied by the user or an automated mechanism. In some embodiments a cam might be rotated to press locking member 26, 19 into corresponding shaft 2, 9.

When locking blocks 46 in declination shaft 9 engage worm wheel 13, this permits the motor 24 to drive worm screw 5 which consequently applies torque to worm wheel 13 and declination shaft 9. The application of torque causes the rotation of declination shaft 9 and with it optical instrument seat 11 and any attached optical instrument, e.g. a telescope. When locking blocks 44 in right ascension shaft 2 engage worm wheel 17, this permits motor 15 to drive worm screw 16 to apply torque to worm wheel 17 and right ascension shaft 2. Since the right ascension shaft is fixed to right ascension base 1 which connects through to base 22, the application of torque tends to cause declination base 14 to rotate around right ascension shaft 3 and, in particular, around right ascension axis 50.

When locking members 26, 19 are moved into the unlocked configuration, the force applied by locking members 26, 19 to locking blocks 44, 46 is reduced, and the force applied by locking blocks 10, 12 to worm wheels 17, 13 is similarly reduced, such that locking blocks 44, 46 effectively disengage worm wheels 17, 13. When locking blocks 44 in the bore defined by right ascension shaft 2 are disengaged from worm wheel 17, declination base 14 is able to rotate freely from, or with less interference from, right ascension shaft 2. When locking blocks 46 in the bore defined by declination shaft 9 are disengaged from worm wheel 13, declination shaft 9 is able to rotate freely from, or with less interference from, declination base 14.

Equatorial mount 100 may comprise a counterweight assembly including a counterweight 34 and a counterweight shaft 36. The counterweight assembly may connect to declination base 14 and rotate therewith around the right ascension shaft. The counterweight assembly and, in particular counterweight 34 may work to balance the equatorial mount over the base while declination base rotates around right ascension axis 50. Counterweight shaft 36 projects out of declination base 14 in a direction roughly opposed to the direction in which declination shaft 9 protrudes from declination base 14. The axis of counterweight shaft 36 may be parallel to but displaced transversely from declination axis 52 of declination shaft 9. By this arrangement, counterweight 34 may counter the weight of an optical instrument, such as a telescope.

The position of counterweight 34 on counterweight shaft 36 may be adjustable. The adjustment of the position of counter 34 may be used to account for the variations in weight of different telescopes. To balance the weight of a heavier telescope, counterweight 34 may be moved further along counterweight shaft 36 away from declination base 14 to increase the effective torque applied by counterweight 34 by increasing the length of the lever arm.

Declination base 14 may further comprise one or more declination shaft locking nuts 4 and declination worm wheel locking nut 7. Copper pads 8 may be positioned at points around each of declination shaft 9 and right ascension shaft 2 to increase friction between each shaft and its corresponding base, declination base 14 and right ascension base 1, respectively. Increased friction may be desirable in some circumstances, such as when it is desirable to tune the amount of force required to manually turn the shaft so that when mount-rotation mechanisms are disengaged from the corresponding shafts. Copper pads 8 may further prevent axial motion of worm wheel 17, stabilizing in declination base 14.

During use of the equatorial mount as described above, a cradle drives a worm wheel to rotate by means of two worm assemblies (formed by assembling an electric motor and a worm), thereby driving a declination mechanism and an hour angle mechanism to work; when the hour angle locking handle and the declination locking handle are loosened, the declination worm wheel separates from the declination shaft, and the hour angle worm wheel separates from the right ascension shaft, such that the hour angle mechanism and the declination mechanism can be rotated manually. Locking the hour angle locking handle and declination locking handles allows the corresponding worm assemblies to drive the rotation of the shafts. In terms of a locking mechanism, a declination locking handle may be rotated clockwise (the declination locking handle and the declination locking member being fixed to form a single body by means of a screw), thereby causing the declination locking member, which has a taper, to move downwards, then the locking block is pushed to perform outward locking, and due to the fact that the locking block has a taper, the locking block A is caused to expand towards two sides, finally clamping the declination worm wheel and the declination shaft; conversely, the declination worm wheel and the declination shaft are separated from one another. The same principle applies to the hour angle mechanism as to the declination mechanism. An advantage of this is that when the worm wheel is clamped with the shaft, eccentricity of the worm wheel will not occur; thus tracking precision may be relatively high.

Declination Base to Shaft Engagement

In some embodiments of an equatorial mount, the locking mechanism can be provided by pivoting (or otherwise moving) the mount-rotation mechanism (or at least a portion of the mount-rotation mechanism) within the declination base to thereby engage the movable portion of the mount-rotation mechanism or disengage the movable portion of the mount-rotation mechanism.

Figure 8:
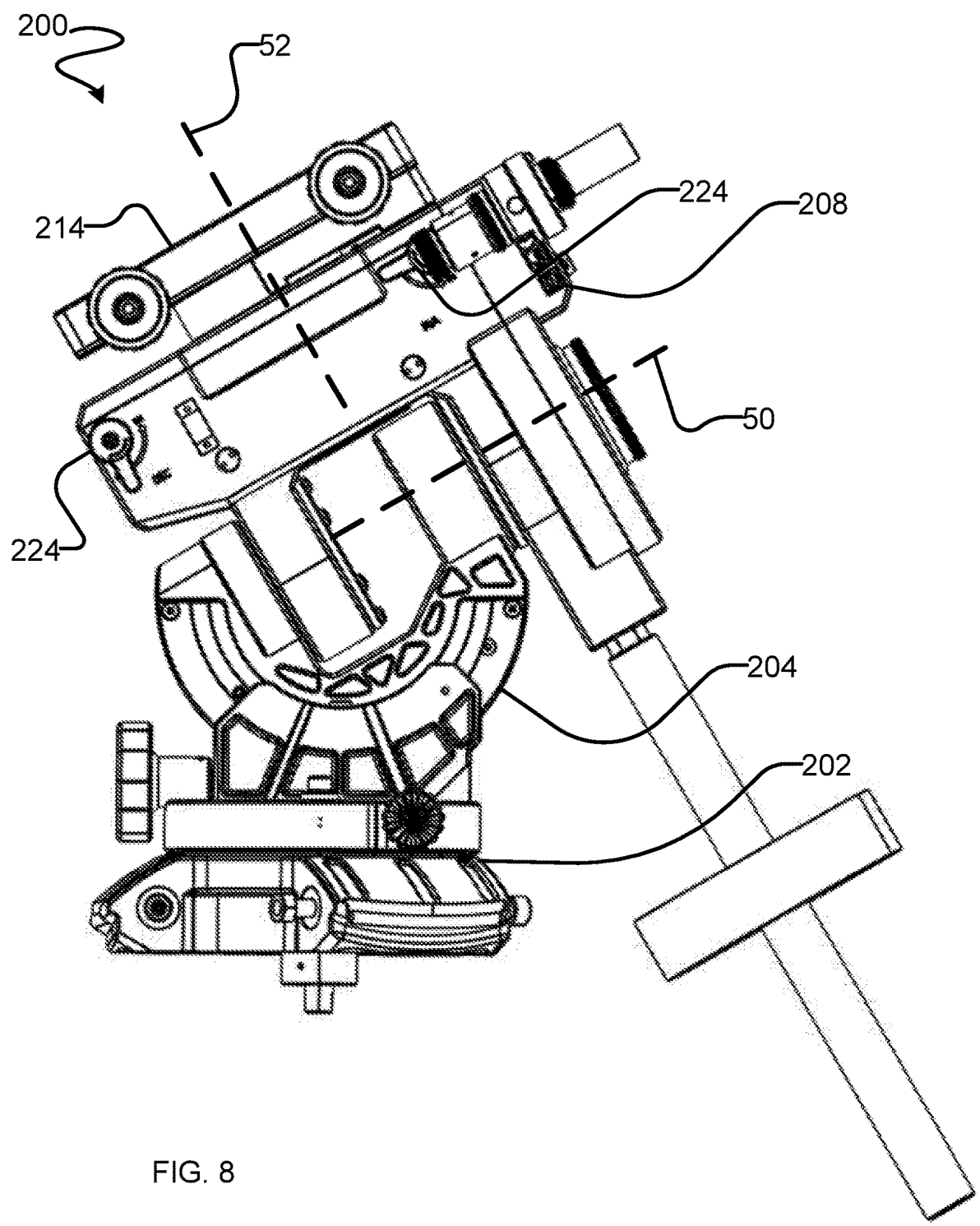
FIG. 8 is a front view of another example embodiment of an equatorial mount.
Figure 9:
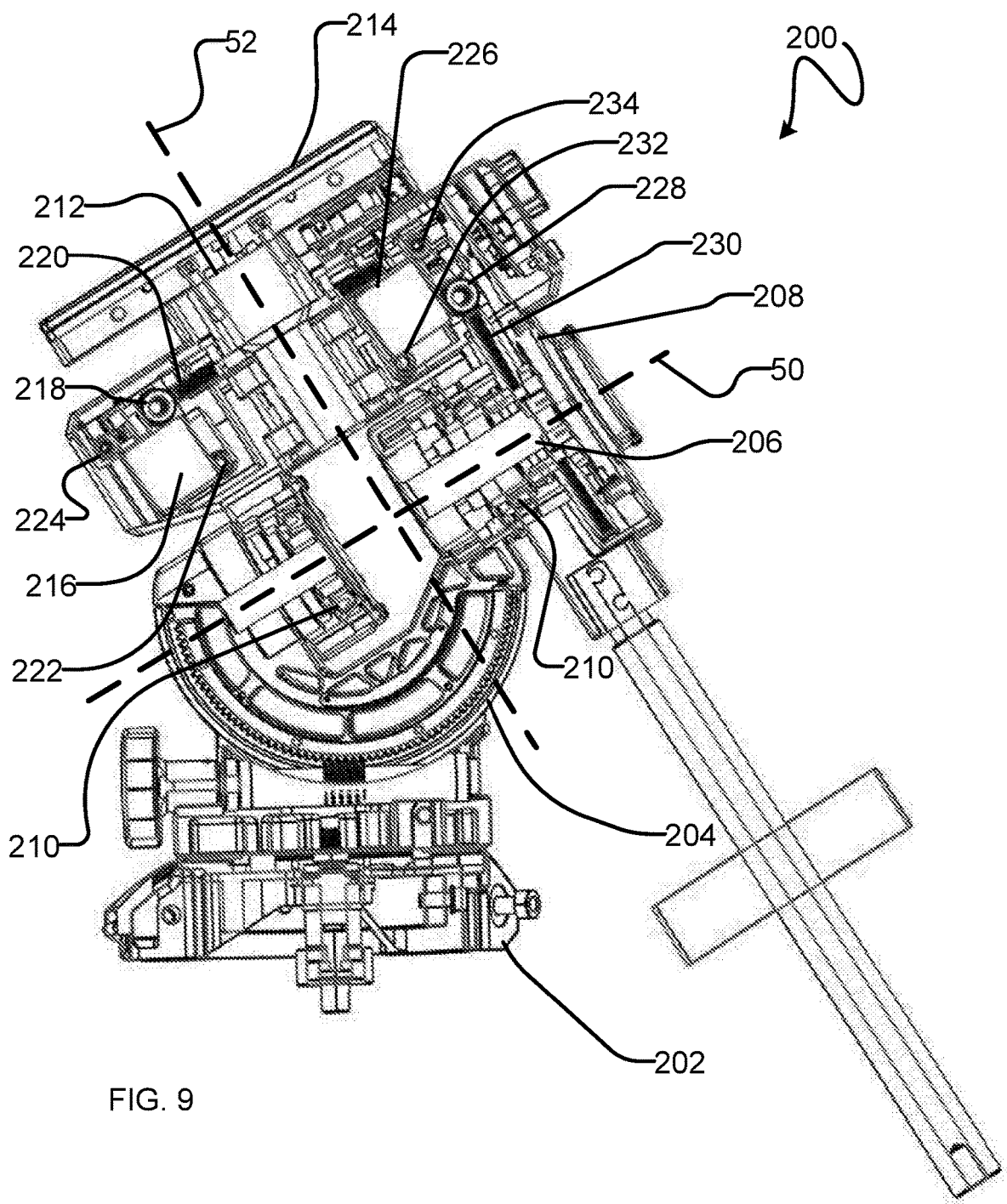
FIG. 9 is a cross-sectional view of the FIG. 8 equatorial mount.

In one such embodiment shown in FIGS. 8 and 9, an equatorial mount 200 comprises a base 202. Base 202 may allow for altitude adjustment of the equatorial mount structure through an altitude adjustment mechanism, and a right ascension base 204 is rotatably connected to base 202 through the altitude adjustment mechanism of base 202. Right ascension shaft 206 extends at least partially into a cavity in right ascension base 204 and is fixed relative to right ascension base 204. At least a part of right ascension shaft 206 may pass through a sleeve in a declination base 208. Declination base 208 is rotatably connected to right ascension base 204 for rotation about right ascension axis 50 relative to right ascension base 204 and right ascension shaft 206. Right ascension shaft 206 may be cylindrical and hollow.

Declination base 208 may connect through one or more points on right ascension base 204 and right ascension shaft 206. The connection of declination base 208 to right ascension base 204 and right ascension shaft 206 may occur through bearings 210 to permit relative rotation of declination base 208.

A declination shaft 212 extends at least partially into a cavity in declination base 208. Declination shaft 212 is rotatable around declination axis 52 relative to right ascension base 204. At an end of declination shaft 212 an optical instrument seat 214 is fixed to provide a seat for an optical instrument (not shown). A telescope may be mounted to optical instrument seat 214. Rotation of declination base 208 around right ascension axis 50—rotation through the hour angle—causes corresponding rotation of the telescope. Rotation of declination shaft 212 about declination axis 52 similarly causes rotation of the telescope through the declination angle.

Declination base 208 comprises one or more mount-rotation mechanisms. Each mount-rotation mechanism is movable between an engaged and a disengaged position. When moved into an engaged position with one of declination shaft 212 and right ascension shaft 206 the mount-rotation mechanism is engaged with the relevant shaft and able to impart torque to the shaft. In the disengaged position the mount-rotation mechanism are disconnected so that the relevant shaft and the declination base are able to rotate relative to each other without interference from the mount-rotation mechanism.

In the embodiment shown in FIG. 9, considering specifically a mount-rotation mechanism engagable to declination shaft 212, the mount-rotation mechanism comprises a motor 216, and a worm screw 218. A worm wheel 220 is fixedly connected to the declination shaft 212 for rotation therewith. The mount-rotation mechanism, including worm screw 218, may be moved into a position in which the mount-rotation mechanism engages with worm wheel 220 and declination shaft 212 to impart rotation. In this position worm screw 216 enmeshes with worm wheel 220 so that, when worm screw 218 is driven by motor 216, it rotates, in turn, worm wheel 220 and declination shaft 212 about declination axis 52.

Movement of mount-rotation mechanism into an engaged position is provided by pivoting the mount-rotation mechanism about pivot pin 222. In the embodiment shown in FIG. 9 rotation of motor 216 and worm screw 218 in a clockwise rotation about pivot pin 222 moves the mount-rotation mechanism into an engaged position, while counter clockwise rotation moves the mount-rotation mechanism into a disengaged position. A bias (not shown), such as a spring, may be provided to bias mount-rotation mechanism into one or the other of the engaged and disengaged positions. For example, a spring may be positioned between motor 216 and an exterior wall of declination base 208 in compression to bias the mount-rotation mechanism into the engaged position, or, alternatively, in tension to bias the mount-rotation mechanism into the disengaged position.

A pivot control mechanism may allow a user to cause the mount-rotation mechanism to pivot about pivot pin 222. In the embodiment shown in FIG. 9 pivot control mechanism comprises a cam 224. Cam 224 is rotatable about an axis parallel to pivot pin 222. An interior portion of cam 224 has a wide dimension and a narrow dimension. When cam 224 is rotated a face of the wide dimension of cam 224 bears against part of the mount-rotation mechanism to force it to rotate in the clockwise direction, moving it into the engaged position. When the cam is rotated further, wide dimension ceases to bear against the mount-rotation mechanism and the bias (not shown) pushes the mount-rotation mechanism back into a disengaged position.

In the embodiment shown, for a mount-rotation mechanism connecting to right ascension shaft 206, a worm wheel 230 is fixedly connected right ascension shaft 206 for rotation therewith. The mount-rotation mechanism, including a motor 226 and a worm screw 228, may be moved into the engaged position so that worm screw 228 meshes with worm wheel 230 to impart torque to right ascension shaft 206. When worm screw 228 is driven by motor 226, it applies a torque, in turn, to worm wheel 230 and right ascension shaft 206. Since right ascension shaft 206 is fixed to right ascension base 204 and thereby to base 202 the relative rotation caused by this torque tends to cause declination base 208 (in which the mount-rotation mechanisms are housed) to rotate around right ascension axis 50 and relative to right ascension shaft 206.

In the embodiment shown a pivot mechanism 232 for a mount-rotation mechanism connecting to right ascension shaft 206 works similarly to that for a mount-rotation mechanism connecting to declination shaft 212. Rotation of motor 226 and worm screw 228 in a clockwise rotation about pivot pin 232 moves the mount-rotation mechanism into an engaged position, while counter clockwise rotation moves the mount-rotation mechanism into a disengaged position. A bias (not shown), such as a spring, may similarly be provided to bias mount-rotation mechanism into one or the other of the engaged and disengaged positions. For example, a spring may be positioned between motor 226 and an exterior wall of declination base 208 in compression to bias the mount-rotation mechanism into the engaged position, or, alternatively, in tension to bias the mount-rotation mechanism into the disengaged position.

A pivot control may allow a user to cause the mount-rotation mechanism to pivot about pivot pin 232. In the embodiment shown in FIG. 9 pivot control comprises a cam 234. Cam 234 is rotatable about an axis parallel to pivot pin 232. An interior portion of cam 234 has a wide dimension and a narrow dimension. When cam 234 is rotated a face of the wide dimension of cam 234 bears against part of the mount-rotation mechanism to force it to rotate in the clockwise direction, moving it into the engaged position. When the cam is rotated further, wide dimension ceases to bear against the mount-rotation mechanism and the bias (not shown) pushes the mount-rotation mechanism back into a disengaged position.

Operation

In operation, an equatorial mount 100, 200 with either an axially moving locking member or a pivoting mount-rotation mechanism may be used to allow a user to engage or disengage a mount-rotation mechanism for one or both of declination axis 52 and right ascension axis 50. When the mount-rotation mechanisms are disengaged, i.e. disengaged from the relevant shaft, corresponding parts of the equatorial mount may be manually rotatable to bring them into a desired position. When mount-rotation mechanisms are engaged, i.e. engaged with the relevant shaft, the motor is able to drive rotation of the relevant parts of the mount. Manual rotation may be desirable, for example, when the user wants to swing the telescope quickly to view a particular part of the sky.

In an equatorial mount 100 using an axially moving locking member, the user may engage the mount-rotation mechanism from either shaft by moving the locking member into the engaged position. For example, this may be done by turning the locking handle to move the locking member in a direction into the shaft to bear against locking blocks and cause the locking blocks to bear against an interior face of a corresponding worm wheel. To disengage the mount-rotation mechanism the user may turn the locking handle in a second direction, causing the locking member to move in a direction out of the shaft and to cease pressing against the locking blocks. This reduces the friction between the locking blocks and the worm wheel, thereby permitting relative rotation of the shaft and its corresponding worm wheel.

In an equatorial mount 200 using a moving mount-rotation mechanism, a user may engage the mount-rotation mechanism by moving the mount-rotation mechanism into engagement with the corresponding shaft. In the example shown, the may be accomplished for example, by pivoting the mount-rotation mechanism, which in this case comprises a motor and worm screw, into meshing engagement with a worm wheel attached to the shaft. This allows the motor to drive the worm wheel and shaft through the worm screw. The user may disengage the mount-rotation mechanism by pivoting the motor and worm screw out of engagement with the worm wheel, allowing relative rotation of the shaft and the declination base. Pivoting the mount-rotation mechanism into or out of engagement with the shaft may be accomplished, for example, by turning a cam accessible on the exterior of the equatorial mount. A bias, such as a spring, may be provided to bias the mount-rotation mechanism either into or out of engagement with the shaft.

When the mount-rotation mechanisms are engaged, they may be controlled by a controller and interface (not shown) provided with the equatorial mount. The controller and interface may provide a number of automated functions that operate the mount-rotation mechanisms. For example, the controller and interface may provide a GoTo function. When using the GoTo function, the user may enter coordinates or other information about a desired thing to be viewed. The controller then controls the mount-rotation mechanisms to rotate the declination base (including the declination shaft and telescope) about right ascension axis 50, and the declination shaft (including the telescope) about declination axis 52. As a further example, a tracking mode may be provided by the controller and interface. A user, having found a celestial object they wish to view for a period of time, may choose to track the object. When an equatorial mount has been set up correctly (i.e. with right ascension axis 50 aligned in parallel with the axis of rotation of the Earth), celestial objects at sufficient distances may be followed purely by rotation of the optical instrument around right ascension axis 50. When set up correctly, these objects will appear to spin about the line into infinity of right ascension axis 50 at a constant speed of 360° every 24 hours, or 15° per hour. The tracking mode may set the equatorial mount to rotate in the same direction at 15° per hour to match the movement of the object in the sky.

The interface and controller may, for example, be embedded in the declination base of the equatorial mount. In other embodiments, the and controller may be attachable to other portions of the equatorial mount and connected to the mount-rotation mechanism through wiring, cables, or a wireless connection. The interface and controller could comprise for example a hand controller.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. An equatorial mount for an optical instrument, the equatorial mount comprising:
   a base;
   a right ascension base comprising a right ascension shaft elongated along a right ascension axis;
   a declination base rotatably mounted to the right ascension base for rotation about the right ascension axis relative to the right ascension base;
   a declination shaft rotatably mounted to the declination base for rotation about a declination axis;
   a mount-rotation mechanism;

a locking mechanism for operably engaging the mount-rotation mechanism to at least one of the right ascension shaft and the declination shaft, the locking mechanism comprising:
 a locking member extendable into at least one of:
  a right ascension bore defined by the right ascension shaft in a direction parallel to the right ascension axis; and
  a declination bore defined by the declination shaft in a direction parallel to the declination axis; and
 at least one of:
  one or more right ascension locking blocks extending at least partially into the right ascension bore; and
  one or more declination locking blocks extending at least partially into the declination bore;
the locking mechanism convertible between:
 a locked configuration wherein:
  the locking member is in a first position relative to the at least one of the right ascension bore and the declination bore;
  the locking member bears against the at least one of the one or more right ascension locking blocks and the one or more declination locking blocks to apply force thereto;
  the at least one of the one or more right ascension locking blocks and the one or more declination locking blocks in turn bear against the mount-rotation mechanism to apply force thereto; and
  at least one of:
   a transfer of force between the locking member, the one or more right ascension locking blocks and the mount-rotation mechanism causes the mount-rotation mechanism to operably engage the right ascension shaft such that a torque applied by the mount-rotation mechanism to the right ascension shaft causes relative rotation between the right ascension shaft and the declination base about the right ascension axis; and
   a transfer of force between the locking member, the one or more declination locking blocks and the mount-rotation mechanism causes the mount-rotation mechanism to operably engage the declination shaft such that a torque applied by the mount-rotation mechanism to the declination shaft causes relative rotation between the declination shaft and the declination base about the declination axis;
 an unlocked configuration wherein:
  the locking member is at a second position relative to the at least one of the right ascension bore and the declination bore;
  the force applied by the locking member to the at least one of the one or more right ascension locking blocks and the one or more declination locking blocks is reduced relative to the force in the locked configuration; and
  the force applied by the at least one of the one or more right ascension locking blocks and the one or more declination locking blocks to the mount-rotation mechanism is reduced relative to the force in the locked configuration.

2. The equatorial mount of claim 1 wherein:
the locking member is axially extendable into the at least one of the right ascension bore and the declination bore;
the first position is a first axial position relative to the at least one of the right ascension bore and the declination bore; and
the second position is a second axial position relative to the at least one of the right ascension bore and the declination bore.

3. The equatorial mount of claim 2 wherein a surface of the locking member comprises a locking-member inclined surface and a surface of each of the at least one of the one or more right ascension locking blocks and the one or more declination blocks comprises a locking-block inclined surface and wherein, in the first axial position, the locking member is positioned such that the locking-member inclined surface bears against the locking-block inclined surface of each of the at least one of the one or more right ascension locking blocks and the one or more declination locking blocks.

4. The equatorial mount of claim 3 wherein axial translation of the locking member imparts force to the at least one of: the one or more right ascension locking blocks in a direction that extends from, and is orthogonal to, the right ascension axis; and the one or more declination locking blocks in a direction that extends from, and is orthogonal to, the declination axis.

5. The equatorial mount of claim 4 wherein the locking member threadably engages a corresponding threaded bore-defining surface of the at least one of the right ascension shaft and the declination shaft to convert rotation of the locking member relative to the at least one of the right ascension shaft and the declination shaft into axial translation of the locking member relative to the at least one of the right ascension shaft and the declination shaft.

6. The equatorial mount of claim 1 wherein, when the locking mechanism is in the unlocked configuration, the reduced force applied by the locking member to the at least one of the one or more right ascension locking blocks and the one or more declination locking blocks and the reduced force applied by the at least one of the one or more right ascension locking blocks and the one or more declination locking blocks to the mount-rotation mechanism permit the mount-rotation mechanism to move freely of the at least one of the right ascension shaft and the declination shaft.

7. The equatorial mount of claim 1 wherein the mount-rotation mechanism is supported by the declination base to thereby move with the declination base about the right ascension axis.

8. The equatorial mount of claim 1 wherein the mount-rotation mechanism comprises a motor.

9. The equatorial mount of claim 8 wherein the mount-rotation mechanism comprises a worm screw and a worm wheel, the worm screw connected to be driven by the motor and engaged with the worm wheel.

10. The equatorial mount of claim 9 wherein in the locked configuration the at least one of the one or more right ascension locking blocks and the one or more declination locking blocks bear against the worm wheel.

11. The equatorial mount of claim 9 comprising a second mount-rotation mechanism, wherein the mount-rotation mechanism is engageable with the right ascension shaft, and the second mount-rotation mechanism is engageable with the declination shaft for applying torque to the declination shaft about the declination axis;
 the second mount-rotation mechanism comprising:
  a pivot joint for pivoting the second mount-rotation mechanism relative to the declination shaft between:
   an engaged configuration wherein the second mount-rotation mechanism is engaged with the declination shaft for applying torque to the declination shaft about the declination axis; and a disengaged configuration wherein the declination shaft rotates freely from the second mount-rotation mechanism.

12. The equatorial mount of claim 11 comprising a pivot control mechanism movable between first and second pivot control mechanism positions, wherein in the first pivot control mechanism position, the pivot control mechanism forces the second mount-rotation mechanism into one of the engaged or disengaged configurations and in the second pivot control mechanism position the pivot control mechanism permits the second mount-rotation mechanism to return to an other of the engaged or disengaged configurations.

13. The equatorial mount of claim 12 wherein the pivot control mechanism comprises a cam having an internal portion with a wide dimension and a thin dimension, wherein in the first pivot control mechanism position the wide dimension forces the second mount-rotation mechanism into the engaged configuration and in the second pivot control mechanism the thin dimension permits the second mount-rotation mechanism to return to the disengaged configuration.

14. The equatorial mount of claim 12 comprising a bias, the bias applying a force to bias the second mount-rotation mechanism into one of the engaged and disengaged positions.

15. The equatorial mount of claim 14 wherein the bias comprises a spring.

16. The equatorial mount of claim 1 wherein the at least one of the one or more right ascension locking blocks and the one or more declination locking blocks comprise an inner locking block and an outer locking block and wherein: the outer locking block is disposed adjacent to the inner locking block in a direction extending away from and orthogonal to at least one of the right ascension axis and the declination axis.

17. The equatorial mount of claim 16 wherein the mount-rotation mechanism further comprises a worm screw, the worm screw connected to be driven by the motor and wherein the at least one of the right ascension shaft and the declination shaft comprises a worm wheel fixedly connected to the at least one of the right ascension shaft and the declination shaft.

* * * * *

UNITED STATES PATENT AND TRADEMARK OFFICE
CERTIFICATE OF CORRECTION

PATENT NO. : 11,320,644 B2
APPLICATION NO. : 16/779440
DATED : May 3, 2022
INVENTOR(S) : Yufeng Sun et al.

It is certified that error appears in the above-identified patent and that said Letters Patent is hereby corrected as shown below:

In the Specification

Column 4, Line 25: Replace "a an" with --an--

Column 9, Line 31: Delete "the"

Column 16, Line 14: Replace "are" with --is--

Column 18, Line 1: Replace "the" with --this--

Column 18, Line 43: Delete "and"

Signed and Sealed this
Twelfth Day of March, 2024

Katherine Kelly Vidal
*Director of the United States Patent and Trademark Office*